United States Patent
Lin

(10) Patent No.: US 9,442,531 B2
(45) Date of Patent: Sep. 13, 2016

(54) MOBILE DEVICE PROTECTING SYSTEM AND METHOD

(71) Applicants: INVENTEC (PUDONG) TECHNOLOGY CORPORATION, Shanghai (CN); INVENTEC CORPORATION, Taipei (TW)

(72) Inventor: Feng Lin, Shanghai (CN)

(73) Assignees: INVENTEC (PUDONG) TECHNOLOGY CORPORATION (CN); INVENTEC CORPORATION (TW)

( * ) Notice: Subject to any disclaimer, the term of this patent is extended or adjusted under 35 U.S.C. 154(b) by 318 days.

(21) Appl. No.: 14/219,083

(22) Filed: Mar. 19, 2014

(65) Prior Publication Data
US 2015/0149408 A1    May 28, 2015

(30) Foreign Application Priority Data
Nov. 28, 2013   (CN) .......................... 2013 1 0626991

(51) Int. Cl.
*G06F 11/00*    (2006.01)
*G06F 1/16*    (2006.01)

(52) U.S. Cl.
CPC ........... *G06F 1/1656* (2013.01); *G06F 1/1626* (2013.01); *G06F 2200/1633* (2013.01); *G06F 2200/1634* (2013.01)

(58) Field of Classification Search
CPC ................. G06F 1/626; G06F 1/1656; G06F 2200/1634
See application file for complete search history.

(56) References Cited

U.S. PATENT DOCUMENTS

| | | | |
|---|---|---|---|
| 2006/0071798 A1* | 4/2006 | Kiff ...................... | A61B 5/0002 340/573.1 |
| 2009/0186672 A1* | 7/2009 | Duff ......................... | G06F 1/30 455/575.8 |
| 2013/0165140 A1* | 6/2013 | Bahl ....................... | G06F 21/88 455/456.1 |
| 2013/0165161 A1* | 6/2013 | Bahl ................. | H04W 28/0221 455/457 |
| 2013/0329047 A1* | 12/2013 | Jankowski ............. | G08B 25/08 348/158 |

* cited by examiner

*Primary Examiner* — Charles Ehne
(74) *Attorney, Agent, or Firm* — Bacon & Thomas, PLLC

(57) ABSTRACT

A mobile device protecting system and method are disclosed, in which an accelerometer sensor detects a tri-axis acceleration data, a trigger signal is transmitted to the mobile device when the tri-axis acceleration data is according with a falling status, so that a data of the mobile device is acquired to serve as a backup data and the backup data is stored in a backup space of the mobile protecting device, achieving in a technical efficacy of enhancing a protection result of the mobile device.

8 Claims, 5 Drawing Sheets

MOBILE DEVICE PROTECTING SYSTEM AND METHOD

BACKGROUND OF THE RELATED ART

1. Field of the Invention

The present invention relates to a protecting system and method. In particular, the present invention relates to a mobile protecting device automatically startup protection mechanisms when the mobile protecting device detects a mobile device is according with a falling status.

2. Related Art

Recently years, with the prevalence and development of mobile devices, most users have more mobile devices. However, since the mobile device has the feature of mobility, it is probable to fall off. Hence, it is quite an unresolved issue of well protecting the mobile device when it falls off in the industry.

Generally, a conventional mobile device protecting manner is to add a protecting element thereto, such as a mobile protecting device (e.g., a protection case). However, this manner only has a limited effect. When the mobile device falls off, the resulted vibration may cause a damage to the mobile device, and thus lead to a failure to activation of itself. This would subsequently affect acquisition of data in the mobile device and even result in data missing or damage, Therefore, the conventional protecting manner has the issue of poor protection to effect on the mobile device.

In view of this, there is a proposed way to synchronize the data of the mobile device to a cloud database that the mobile device periodically transmits data to the cloud database to reserve a backup version of the data as a data protection, whereby solving the situation where the user can not acquire the data when the mobile device encounters a failure. However, although this manner may reduce the possibility of data missing or damage, the backup data has to be updated before a possible fall-off action or collision of the mobile device. In addition, in the course of transmission of the data through the Internet associated with IP protocol to the cloud database, a network safety issue is still encountered. Therefore, the above manner still needs to be improved in the protection effect.

In view of the above, the issue of the protection result to be improved requires to be addressed by setting forth an effective technology.

SUMMARY OF THE INVENTION

The present invention relates to a mobile device protecting system and method.

The mobile device protecting system applied on a mobile protecting device according to the present invention. The mobile device protecting system comprises a storage module for storing a backup data of the mobile device; a sensor module for detecting the mobile protecting device continuously by an accelerometer sensor to generate a tri-axis acceleration data; an analysis module for analyzing the tri-axis acceleration data, and generating a trigger signal when the tri-axis acceleration data is according with a predetermined falling status; and a backup module for transmitting the trigger signal to the mobile device, and obtaining a data of the mobile device as the backup data and storing the backup data to the storage module.

The mobile device protecting method applied on a mobile protecting device according to the present invention, comprises steps of detecting the mobile protecting device continuously by an accelerometer sensor to generate a tri-axis acceleration data; analyzing the tri-axis acceleration data, and generating a trigger signal when the tri-axis acceleration data is according with a predetermined falling status; transmitting the trigger signal to the mobile device; and obtaining a data of the mobile device as a backup data and storing the backup data.

As described above, the invention differs from the prior art in the following aspects. The mobile protecting device may acquire the current data of the mobile device as the backup data immediately when the mobile device falls off.

By means of the above mechanism, the present invention may enhance a protection of the mobile device.

BRIEF DESCRIPTION OF THE DRAWINGS

The invention will become more fully understood from the detailed description given herein below illustration only, and thus is not limitative of the present invention, and wherein.

DETAILED DESCRIPTION OF THE DRAWINGS

The present invention will be apparent from the following detailed description, which proceeds with reference to the accompanying drawings, wherein the same references relate to the same elements.

Prior to the description of the mobile device protecting system and method of the present invention, an application environment of the present invention is described first. The present invention is used on a mobile device for providing a protection thereon, such as a smart mobile phone. In real implementation, the mobile protecting device may communicate with the mobile device through a wireless network or radio frequency identification (RFID). The wireless network or radio frequency identification belongs to the prior art, so it is omitted here for clarity. In addition, the mobile protecting device of the present invention may have a connection with a connection port of the mobile device, so that the mobile protecting device may use a power source of the mobile device when it does not equip battery and communicate with the mobile device through the connection port of the mobile device.

Figure 1:
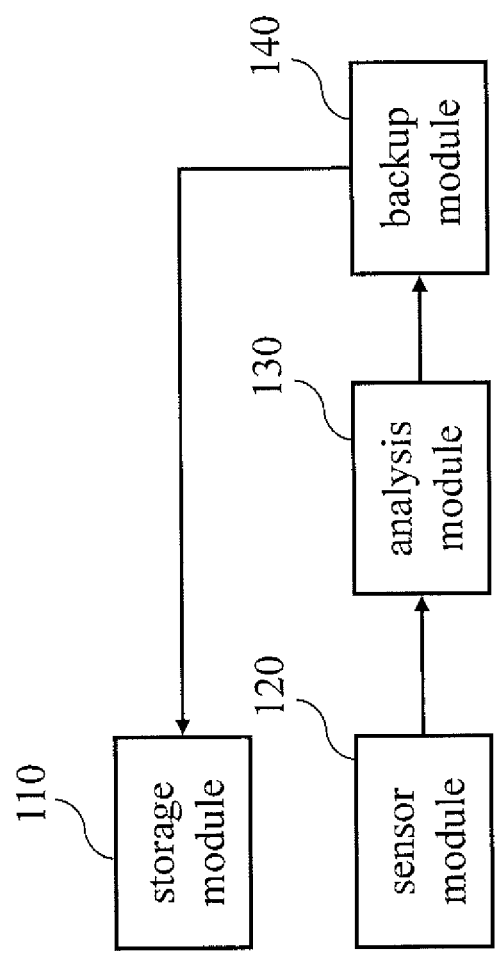
FIG. 1 is a systematic block diagram of a mobile device protecting system according to the present invention.

Here in below, the mobile device protecting system and methods are described with reference to FIG. 1. Referring to FIG. 1, a systematic block diagram of the mobile device protecting system of the present invention is illustrated therein. The system comprises a storage module 110, a sensor module 120, an analysis module 130 and a backup module 140. The storage module 110 may have a backup space to store a backup data originally from the mobile device therein. Such memory may be a space of a nonvolatile memory (NVM).

The sensor module 120 is used to detect the mobile protecting device continuously by an accelerometer sensor to generate a tri-axis acceleration data. Since the generation of the tri-axis acceleration data belongs to the prior art, the description therefor is omitted here for clarity.

The analysis module 130 is used to analyze the tri-axis acceleration data. When the tri-axis acceleration data is according with a predetermined falling status, a trigger signal is generated. It is to be particularly pointed out that the mobile protecting device includes a protecting case encasing itself therein and a flexible cover. The analysis module 130 may drives the flexible cover, and covers the flexible cover on a display panel of the mobile device, when the trigger signal has been generated.

In real implementation, the flexible cover is bounced off from a side of the mobile protecting device, and connected to the other side of the mobile protecting device for covering the entirety of the display panel to protect for it. The flexible cover may be connected by fastener, magnetism or rubber groove. Thus, the flexible cover and the protecting case jointly form a relatively enclosed space to cover the whole mobile device.

The backup module 140 is used to transmit the trigger signal to the mobile device, and acquire the data of the mobile device as a backup data and store the backup data at a backup space in the storage module 110. In real implementation, the backup module 140 may transmit the trigger signal to the mobile device, the mobile device backups and receives the backup data transmitted from the mobile device. Furthermore, the data is backup and stored in the backup space. Alternatively, the mobile protecting device may pre-acquire a privilege for accessing the mobile device. At this time when the trigger signal is received by the mobile device, the mobile protecting device may directly backup the data as the backup data.

Figure 2:
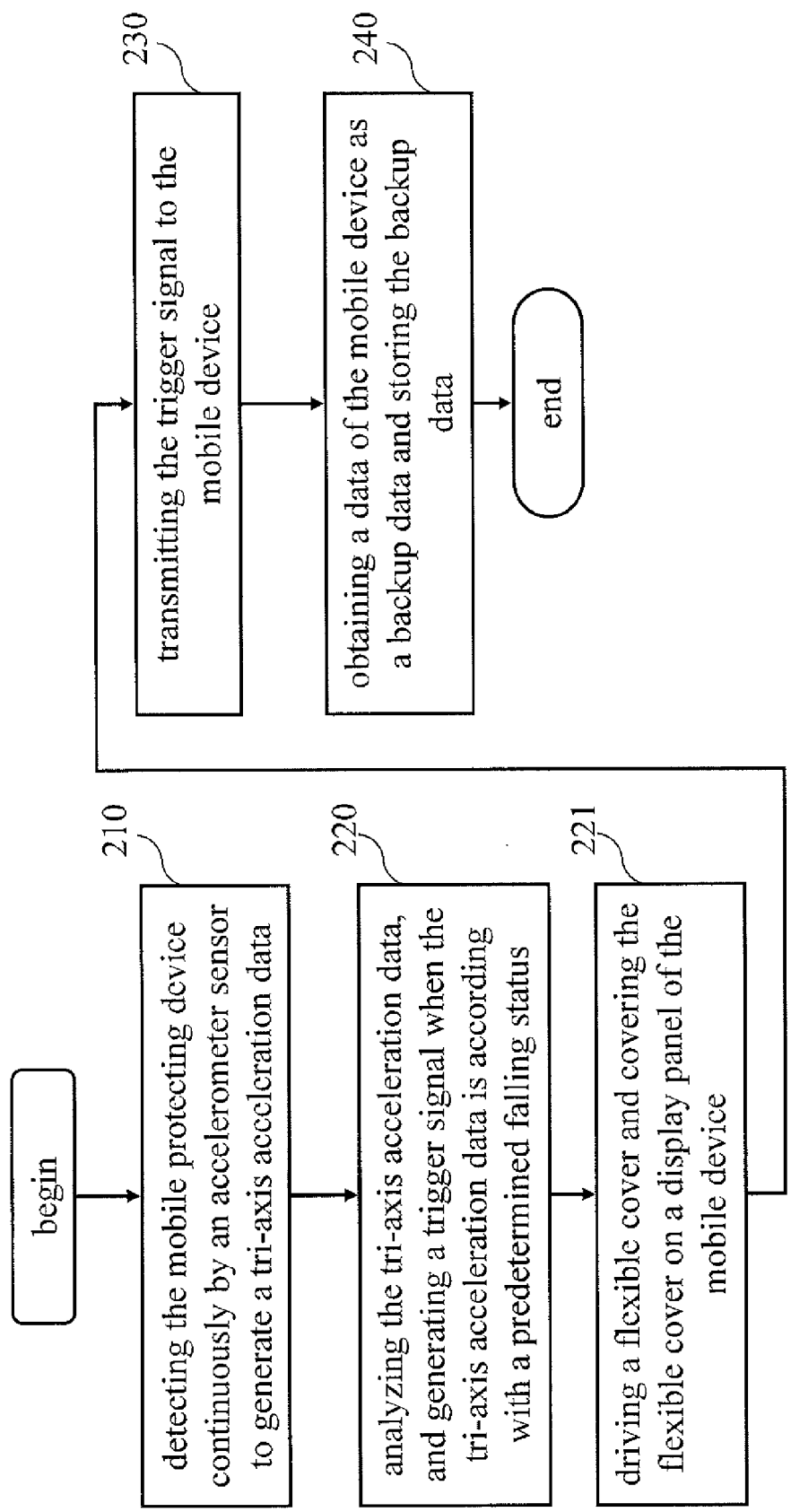
FIG. 2 is a flowchart diagram of a mobile device protecting method according to the present invention.

Referring to FIG. 2, in which the mobile device protecting method applied onto the mobile protecting device according to the present invention is illustrated in a flowchart form.

The method comprises the following steps: detecting the mobile protecting device continuously by an accelerometer sensor to generate a tri-axis acceleration data (Step 210); analyzing the tri-axis acceleration data, and generating a trigger signal when the tri-axis acceleration data is according with a predetermined falling status (Step 220); transmitting the trigger signal to the mobile device (Step 230); and obtaining a data of the mobile device as a backup data and storing the backup data (Step 240).

By means of the above steps, the accelerometer sensor of the mobile protecting device may detect the tri-axis acceleration data, a trigger signal is transmitted to the mobile device when the tri-axis acceleration data is according with a falling status, so that the data of the mobile device is acquired to serve as the backup data and the backup data is stored in a backup space of the mobile protecting device.

It is to be particularly noted that there may further be a step of driving a flexible cover and covering the flexible cover on a display panel of the mobile device (Step 221) after the step 220 of generating the trigger signal. As such, the flexible cover may be used to protect the flexible cover in the course of falling of the mobile device. Further, the protecting case is also provided to protect an outer wall of the mobile device. This double protecting measure may effectively avoid damage of the mobile device when a collision even with a rigid article occurs.

Figure 3:
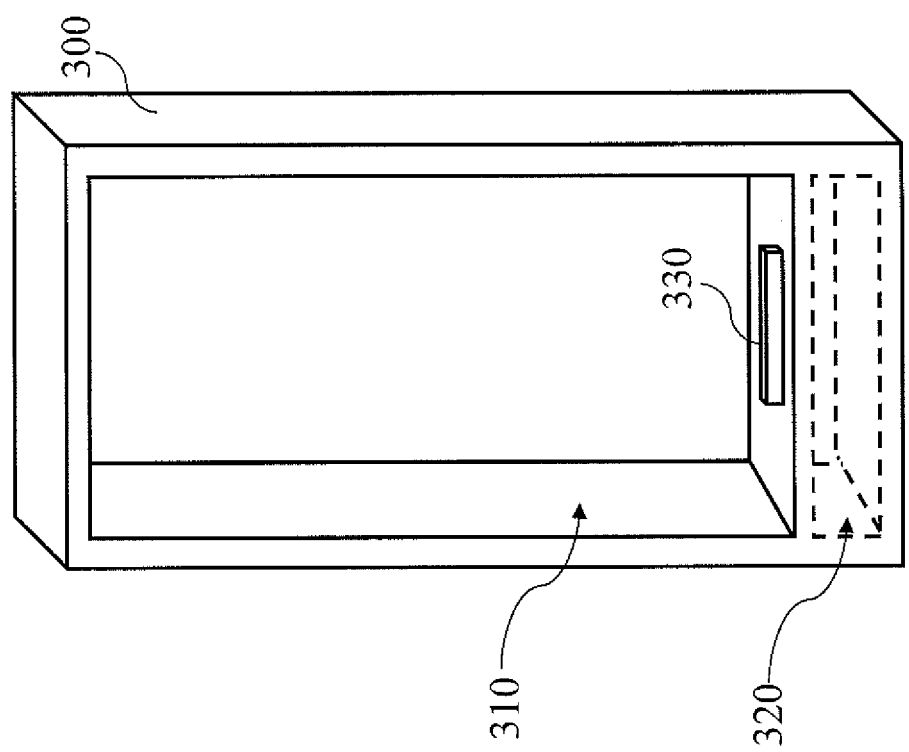
FIG. 3 is a schematic diagram of the mobile protecting device according to the present invention.

In the following, embodiments are illustrated with reference to FIG. 3 to FIG. 4B. FIG. 3 is a schematic diagram of the mobile protecting device according to the present invention. In real implementation, the mobile protecting device 300 may have a protecting case 310 and a reception space 320. The reception space 320 may be set up in or be independently of the protecting case 310, without limiting thereto in the present invention.

The protecting case 310 is used to receive the mobile device, such as a smart phone. As to the reception space 320, it is used to receive electronic elements of the storage module 110, the sensor module 120, the sensor module 130, and the backup module 140, such as accelerometer sensors and a nonvolatile memory (NVM), etc. Even a battery may be received within the reception space 320 for power supplying to the electronic elements, Subsequently, when the mobile device is disposed within the protecting case 310, it may be electrically connected to the mobile protecting device 300 through a connection port 330, so that the trigger signal generated may be transmitted to the mobile device through the port 330 and the data may be received from the mobile device as the backup data.

It is to be noted that the wireless transmission technology may be used in replace of the electric connection manner of the connection port 330 in real implementation. Any manner capable of transmitting the trigger signal and the data is deemed within the scope of the present invention.

Figure 4A:
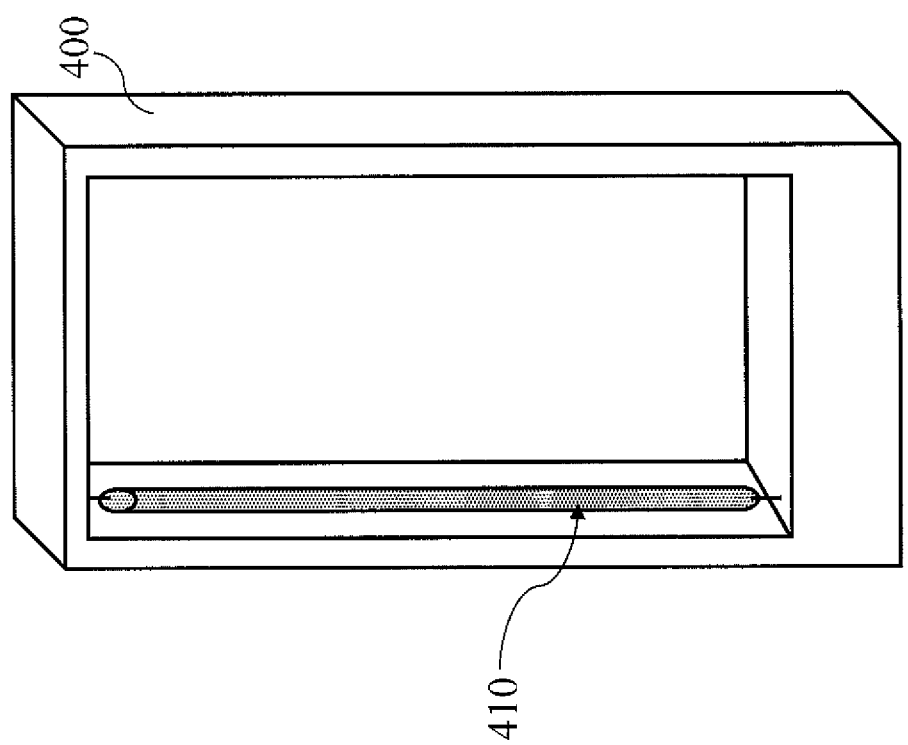
FIG. 4A and FIG. 4B are schematic diagrams showing an application of a flexible cover according to the present invention, respectively.
Figure 4B:
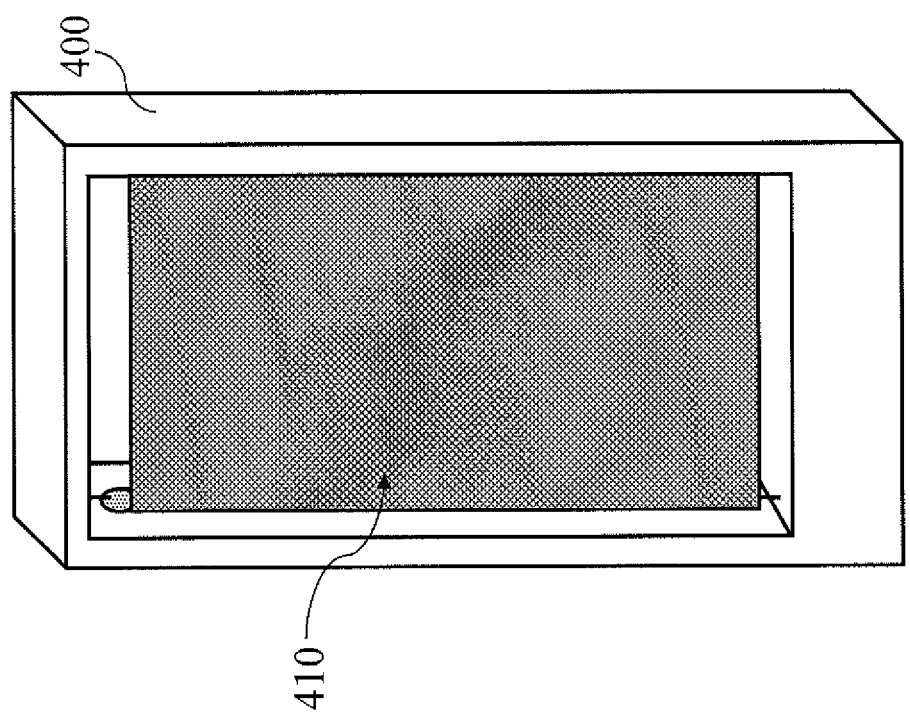

Referring to FIG. 4A and FIG. 4B, which are schematic diagrams showing an application of a flexible cover according to the present invention, respectively. In real implementation, the mobile protecting device may also be disposed with the flexible cover, so that a protection result may be also provided to the display panel of the mobile device in addition to the data protection.

As shown in FIG. 4A, the mobile protecting device 400 has the flexible cover 410 disposed at a side thereof. The flexible cover 410 is tucked as a roll axis when it is without being driven.

After the analysis module 130 generates a trigger signal, the flexible cover 410 is simultaneously driven. At this time, the flexible cover 410 is bounced off from a side of the mobile protecting device 400 owing to a rotation of the roll axis. Furthermore, as shown in FIG. 4B, the flexible cover 410 is connected to the other side of the mobile protecting device 400 for covering the entirety of the display panel. As such, even the mobile device falls off, the display panel may be effectively avoided from collision even with a rigid body.

In view of the above, the system and method of the present invention have the difference as compared to the prior art that the accelerometer sensor of the mobile protecting device detects the tri-axis acceleration data, a trigger signal is transmitted to the mobile device when the tri-axis acceleration data is according with a falling status, so that the data of the mobile device is acquired to serve as the backup data and the backup data is stored in a backup space of the mobile device protecting system. By means of the above mechanism, the present invention may achieve in a technical efficacy of enhancing a protection result of the mobile device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A mobile device protecting system applied on a mobile protecting device, comprising:
    a storage module for storing a backup data of the mobile device;
    a sensor module for detecting the mobile protecting device continuously by an accelerometer sensor to generate a tri-axis acceleration data;

an analysis module for analyzing the tri-axis acceleration data, and generating a trigger signal when the tri-axis acceleration data is according with a predetermined falling status, and driving a flexible cover and covering the flexible cover on a display panel of the mobile device when the trigger signal has been generated; and a backup module for transmitting the trigger signal to the mobile device, obtaining a data of the mobile device as the backup data and storing the backup data to the storage module.

2. The mobile device protecting system as claimed in claim 1, wherein the backup module transmits the trigger signal to the mobile device, the mobile device backups, and the backup module receives the backup data transmitted from the mobile device.

3. The mobile device protecting system as claimed in claim 1, wherein the flexible cover is bounced off from a side of the mobile protecting device, and connected to the other side of the mobile protecting device for covering the entirety of the display panel.

4. The mobile device protecting system as claimed in claim 3, wherein the flexible cover is connected by fastener, magnetism or rubber groove.

5. A mobile device protecting method applied on a mobile protecting device, comprising steps of:

detecting the mobile protecting device continuously by an accelerometer sensor to generate a tri-axis acceleration data;

analyzing the tri-axis acceleration data, and generating a trigger signal when the tri-axis acceleration data is according with a predetermined falling status;

transmitting the trigger signal to the mobile device, driving a flexible cover and covering the flexible cover on a display panel of the mobile device; and obtaining a data of the mobile device as a backup data and storing the backup data.

6. The mobile device protecting method as claimed in claim 5, wherein the step of obtaining the data of the mobile device as the backup data further comprising steps of:

transmitting the trigger signal to the mobile device , the mobile device backups; and receiving the backup data from the mobile device.

7. The mobile device protecting method as claimed in claim 5, wherein the flexible cover is bounced off from a side of the mobile protecting device, and connected to the other side of the mobile protecting device for covering the entirety of the display panel.

8. The mobile device protecting method as claimed in claim 7, wherein the flexible cover is connected by fastener, magnetism or rubber groove.

* * * * *